(12) United States Patent  
Chen et al.

(10) Patent No.: US 12,038,344 B2  
(45) Date of Patent: Jul. 16, 2024

(54) PHASE POWER DEVICE AND FLUID EXPERIMENT SYSTEM

(71) Applicant: PETROCHINA COMPANY LIMITED, Beijing (CN)

(72) Inventors: Xinglong Chen, Beijing (CN); Qingjie Liu, Beijing (CN); Jiazhong Wu, Beijing (CN); Haishui Han, Beijing (CN); Hongwei Yu, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 131 days.

(21) Appl. No.: 17/793,195

(22) PCT Filed: Jan. 13, 2021

(86) PCT No.: PCT/CN2021/071377  
§ 371 (c)(1),  
(2) Date: Jul. 15, 2022

(87) PCT Pub. No.: WO2021/143703  
PCT Pub. Date: Jul. 22, 2021

(65) Prior Publication Data  
US 2023/0204395 A1  Jun. 29, 2023

(30) Foreign Application Priority Data

Jan. 17, 2020 (CN) .......................... 202010058049.8

(51) Int. Cl.  
*G01M 10/00* (2006.01)  
*F15D 1/04* (2006.01)  
(Continued)

(52) U.S. Cl.  
CPC .............. *G01M 10/00* (2013.01); *F15D 1/04* (2013.01); *G01F 1/206* (2013.01); *G01F 15/005* (2013.01); *G01F 15/06* (2013.01)

(58) Field of Classification Search  
CPC .......... G01F 1/206; F15D 1/04; G01M 10/00; G01M 9/02; G01M 9/04  
See application file for complete search history.

(56) References Cited

U.S. PATENT DOCUMENTS 3,513,696 A * 5/1970 Blair ....................... B63B 71/20  
  73/54.16  
2008/0317608 A1 * 12/2008 Gray .................. F04D 15/0209  
  417/43

(Continued)

FOREIGN PATENT DOCUMENTS

| CN | 101261246 A | 9/2008 |
| CN | 102435669 A | 5/2012 |

(Continued)

OTHER PUBLICATIONS

English translation of First Office Action issued in Chinese patent application No. 202010058049.8, on Nov. 18, 2021.

(Continued)

*Primary Examiner* — Paul M. West  
(74) *Attorney, Agent, or Firm* — Meunier Carlin & Curfman LLC

(57) ABSTRACT

A phase power device, comprising: a circulation pipe (1) and a preset number of phase power control components (2), wherein the circulation pipe (1) is used to provide a channel for fluid circulation flow, and the preset number of phase power control components (2) are disposed on the circulation pipe (1) and used to drive fluid in the circulation pipe (1) to circulate and flow. Further provided is a fluid experiment system, comprising the phase power device. The phase power device and the fluid experiment system may enable the fluid to meet a set flow requirement during the experiment, thus reducing the use of auxiliary equipment, and reducing experiment costs.

14 Claims, 7 Drawing Sheets

(51) Int. Cl.
  *G01F 1/20* (2006.01)
  *G01F 15/00* (2006.01)
  *G01F 15/06* (2022.01)

(56) References Cited

U.S. PATENT DOCUMENTS

| | | | |
|---|---|---|---|
| 2009/0211379 A1* | 8/2009 | Reintjes | G01N 1/14 |
| | | | 73/863.23 |
| 2010/0117635 A1 | 5/2010 | Hoyt | |
| 2015/0198512 A1 | 7/2015 | Montgomery et al. | |
| 2016/0339408 A1 | 11/2016 | Sera | |

FOREIGN PATENT DOCUMENTS

| | | | | |
|---|---|---|---|---|
| CN | 102723844 | A | | 10/2012 |
| CN | 103604022 | A | | 2/2014 |
| CN | 203515536 | U | | 4/2014 |
| CN | 104330468 | A | | 2/2015 |
| CN | 204495541 | U | | 7/2015 |
| CN | 205280325 | U | | 6/2016 |
| CN | 106769674 | A | | 5/2017 |
| CN | 107462398 | A | | 12/2017 |
| CN | 107561077 | A | | 1/2018 |
| CN | 107842355 | A | | 3/2018 |
| CN | 207540982 | U | | 6/2018 |
| CN | 108827830 | A | | 11/2018 |
| CN | 109029916 | A | | 12/2018 |
| CN | 109430918 | A | * | 3/2019 ............ A23L 13/70 |
| CN | 209417006 | U | * | 9/2019 |
| CN | 110672302 | A | | 1/2020 |
| CN | 110672302 | A | * | 1/2020 ............ G01M 10/00 |
| GB | 2376077 | A | | 12/2002 |
| JP | 61207943 | A | * | 9/1986 |
| JP | 05231395 | A | | 9/1993 |
| JP | H0850077 | A | | 2/1996 |
| KR | 20180023187 | A | | 3/2018 |

OTHER PUBLICATIONS

English translation of Search Report issued in Chinese patent application No. 202010058049.8, on Nov. 18, 2021.
Ma Zhirong, "Research on the design of experimental loops for oil-gas-water multiphase flow", China Excellent Master's Degree Thesis Full-text Database (Electronic Journal).
English translation of Search Report issued in Chinese patent application No. 202010058049.8, on Nov. 4, 2021.
English Translation of Supplementary search report issued in Chinese patent application No. 202010058049.8, on Jun. 1, 2022.
Gu Wenhuan et al., "Fluid Flow Mechanism in Large Pore Paths Investigated Using Physical Simulation", Science and Technology Herald, 2014.
English Translation of International Search Report in International Application No. PCT/CN2021/071377, mailed Mar. 31, 2021, 4 pages.

* cited by examiner

PHASE POWER DEVICE AND FLUID EXPERIMENT SYSTEM

CROSS-REFERENCE TO RELATED APPLICATIONS

The present disclosure is a National Stage of International Application No. PCT/CN2021/071377, filed Jan. 13, 2021, which claims priority to Chinese Patent Application No. 202010058049.8, filed on Jan. 17, 2020, both of which are hereby incorporated by reference in their entireties.

FIELD

The present disclosure relates to the technical field of oilfield development, and particularly to a phase power device and a fluid experiment system.

BACKGROUND

Researches on the fluid flow process are very extensive, in which it is very common to observe motion states of solid particles, bubbles and repulsive droplets in continuous fluid, during researches and applications of fluid motions.

In the prior art, when fluid in a continuous flowing environment has a small fluid flow rate (<1 $m^3$/d), experimental researches may be conducted in a small laboratory; if the fluid flow rate is large (>1 $m^3$/d), the configuration of experimental devices has high requirements on the site, and the requirements of the experimental devices will be stricter if a high pressure is needed. In the industrial applications of oilfield development, the experimental devices for researching fluid with flow rates greater than 1 $m^3$/d include a collection tank, a stabilization tank, a supplement pump and a large-displacement high-pressure pump, in addition to pipelines and measuring devices. In particular, when a fluid flow in a wellbore string is to be researched, it is necessary to establish an organic string with a height of about 20 meters. Therefore, the existing experimental devices for researching the continuous flow of fluid have the problems such as large floor spaces, too many auxiliary devices, and complicated operations.

SUMMARY

Aiming at the problems in the prior art, the embodiments of the present disclosure provide a phase power device and a fluid experiment system, which can at least partially solve the problems in the prior art.

In an aspect, the present disclosure proposes a phase power device including a circulation pipeline and a preset number of phase power control components. The circulation pipeline is configured to provide a channel for fluid circulation, and the preset number of phase power control components are disposed on the circulation pipeline to drive the fluid circulation in the circulation pipeline.

In one embodiment, the circulation pipeline includes four straight pipe sections, four elbow pipe sections, at least one phase power pipe section and at least one observation window pipe section. The four straight pipe sections, the four elbow pipe sections, the at least one phase power pipe section and the at least one observation window pipe section are connected end to end to form the circulation pipeline. The phase power pipe section is provided with the phase power control component.

In one embodiment, the number of the observation window pipe sections is four, and the number of the phase power pipe sections is four. Each of the phase power pipe sections is provided with one of the phase power control components. The four straight pipe sections, the four observation window pipe sections, the four elbow pipe sections and the four phase power pipe sections are classified into four groups of pipes, and each group of pipes includes one of the straight pipe sections, one of the observation window pipe sections, one of the elbow pipe sections and one of the phase power pipe sections. The phase power pipe section, the straight pipe section, the observation window pipe section and the elbow pipe section in each group of pipes are connected in sequence, and the groups of pipes are connected end to end.

In one embodiment, two ends of each of the straight pipe sections are provided with flanges, two ends of each of the observation window pipe sections are provided with flanges, two ends of each of the elbow pipe sections are provided with flanges, and two ends of each of the phase power pipe sections are provided with flanges. The straight pipe sections, the elbow pipe sections, the phase power pipe sections and the observation window pipe sections are connected through the flanges to form the circulation pipeline.

In one embodiment, the straight pipe section is provided with a fluid injection interface, a pressure sensor interface, an operation window, and a safety valve.

In one embodiment, the preset number of phase power control components are uniformly disposed along the circulation pipeline.

In one embodiment, the phase power control component includes a piston barrel, a piston, a retaining ring, and a joint. The piston is disposed in the piston barrel and movable along the piston barrel. The joint is disposed at a tail of the piston barrel. The retaining ring is fixed on an inner wall of the piston barrel to limit a movement of the piston towards the circulation pipeline. A front end of the piston barrel is disposed on the circulation pipeline. The piston barrel is communicated with the circulation pipeline.

In one embodiment, the phase power control component includes a piston barrel, a piston, and a retaining ring. The piston is disposed in the piston barrel and movable along the piston barrel. The piston includes a piston rod, which is extended out of a rear end of the piston barrel. The retaining ring is fixed on an inner wall of the piston barrel to limit a movement of the piston towards the circulation pipeline. A front end of the piston barrel is disposed on the circulation pipeline, and the piston barrel is communicated with the circulation pipeline.

In one embodiment, the preset number is 4 or 8.

In another aspect, the present disclosure provides a fluid experiment system including the phase power device according to any one of the above embodiments, a power joint control module, a fluid injection module, a pressure detection module, a flow velocity detection module, and an integrated control module. The power joint control module is coupled to the preset number of phase power control components respectively and configured to supply power thereto. The fluid injection module is configured to inject fluid into the circulation pipeline. The pressure detection module is configured to detect a pressure in the circulation pipeline. The flow velocity detection module is configured to detect a flow velocity of the fluid in the circulation pipeline. The integrated control module is coupled to the pressure detection module, the flow velocity detection module, and the power joint control module respectively, and configured to control actions of the preset number of phase power control components through the power joint control module.

The phase power device and the fluid experiment system according to the embodiments of the present disclosure include a circulation pipeline and a preset number of phase power control components. The circulation pipeline is configured to provide a channel for fluid circulation, and the preset number of phase power control components are disposed on the circulation pipeline to drive the fluid circulation in the circulation pipeline, which enables the fluid to meet a set flow rate requirement during the experiment, thus decreasing the use of auxiliary devices, and reducing the experiment costs.

BRIEF DESCRIPTION OF THE DRAWINGS

For a clearer illustration of technical features in the embodiments of the present disclosure or the prior art, a brief description of the drawings for the embodiments or the prior art will be given below. Obviously, the drawings described below involve only some embodiments of this disclosure. For those of ordinary skill in the art, other drawings can be derived from these drawings without any inventive efforts.

REFERENCE SIGNS 1-circulation pipeline;
2-phase power control component;
11a-straight pipe section;
11b-straight pipe section;
11c-straight pipe section;
11d-straight pipe section;
12a-elbow pipe section;
12b-elbow pipe section;
12c-elbow pipe section;
12d-elbow pipe section;
13a-phase power pipe section;
13b-phase power pipe section;
14a-observation window pipe section;
14b-observation window pipe section;
21-phase power control component;
22-phase power control component;
23-phase power control component;
24-phase power control component;
2a-phase power control component;
2b-phase power control component;
201-piston barrel;

-continued 202-piston;
203-retaining ring;
204-joint;
205-piston rod;
41a-straight pipe section;
41b-straight pipe section;
41c-straight pipe section;
41d-straight pipe section;
42a-elbow pipe section;
42b-elbow pipe section;
42c-elbow pipe section;
42d-elbow pipe section;
43a-phase power pipe section;
43b-phase power pipe section;
43c-phase power pipe section;
43d-phase power pipe section;
44a-observation window pipe section;
44b-observation window pipe section;
44c-observation window pipe section;
44d-observation window pipe section;
61-high-pressure gas tank;
62-gas booster pump;
63-gas cylinder;
64-pneumatic valve;
80-phase power device;
81-power joint control module;
82-fluid injection module;
83-pressure detection module;
84-flow velocity detection module;
85-integrated control module;
801-circulation pipeline;
802-phase power control component.

DETAILED DESCRIPTION

For a clearer understanding of the objectives, technical features and effects of the embodiments of the present disclosure, specific embodiments will now be described with reference to the drawings. The described embodiments are intended only to schematically illustrate and explain this invention and do not limit the scope of the present disclosure. It should be noted that the embodiments in the present disclosure and the features in the embodiments can be arbitrarily combined with each other without conflict.

Figure 1:
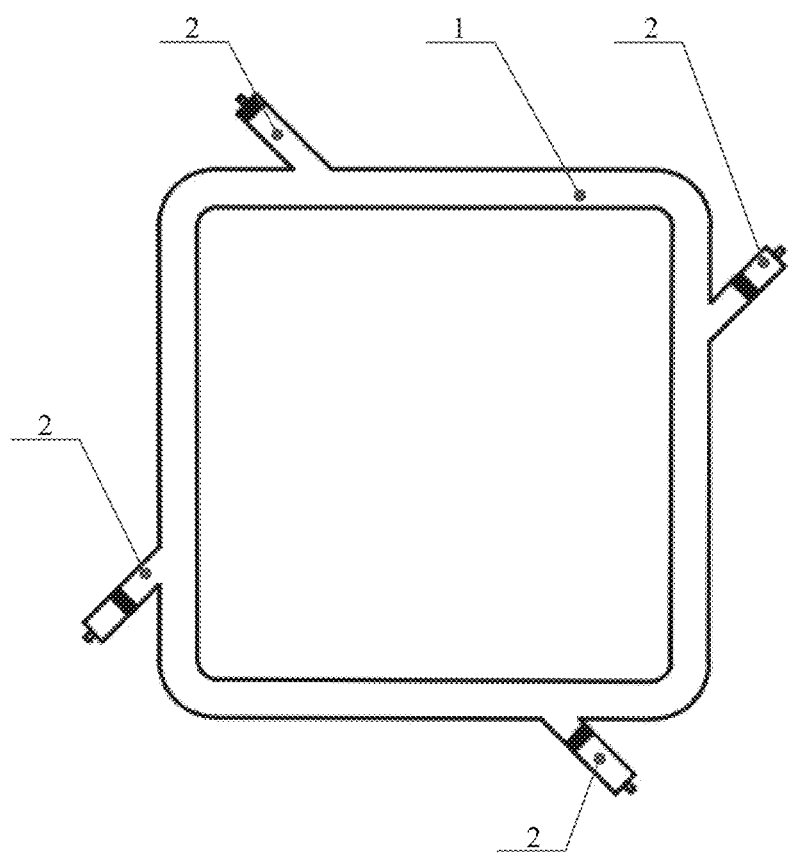
FIG. 1 is a schematic structural diagram of a phase power device according to an embodiment of the present disclosure.

FIG. 1 is a schematic structural diagram of a phase power device according to an embodiment of the present disclosure. As illustrated in FIG. 1, a phase power device according to an embodiment of the present disclosure includes a circulation pipeline 1 and a preset number of phase power control components 2.

The circulation pipeline 1 is configured to provide a channel for circulation. The preset number of phase power control components 2 are disposed on the circulation pipeline 1 to drive the fluid circulation in the circulation pipeline 1. The preset number is set according to actual needs, and is not limited in the embodiments of the present disclosure.

Specifically, the phase power control component 2 may be a piston, and may be externally connected to a power device which pushes the piston to move to drive a circulation of the fluid in the circulation pipeline 1. The power device may be a motor, a hydraulic device, or a gas tank. The phase power control component 2 may be welded on the circulation pipeline 1 and communicated therewith. The fluid in the circulation pipeline 1 circulates in the circulation pipeline 1 under the action of the preset number of phase power control components 2 to reach a set flow velocity. The circulation pipeline 1 may be welded, or may include a plurality of pipe sections, adjacent ones of which are connected by flanges. It should be appreciated that the circulation pipeline 1 has a fluid injection interface, and may also be provided with a pressure gauge interface and an operation window.

The working principle of the phase power device according to the embodiment of the present disclosure will be explained below though an example which adopts four phase power control components 2.

Figure 2:
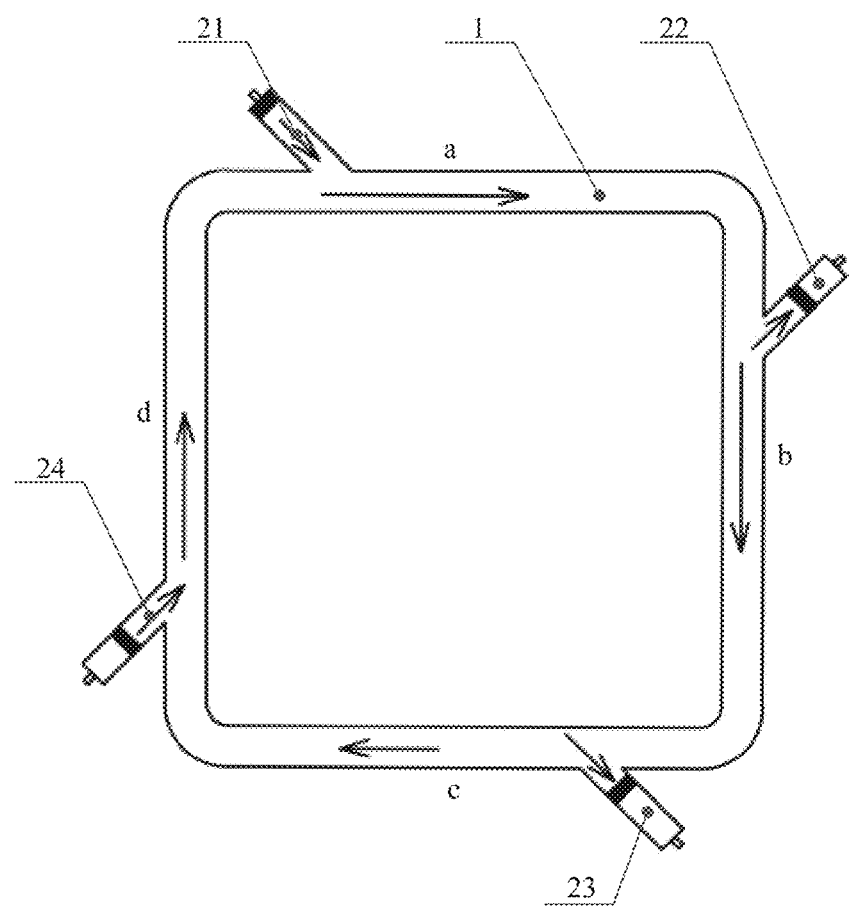
FIG. 2 is a schematic diagram of a working principle of a phase power device according to an embodiment of the present disclosure.

FIG. 2 is a schematic diagram of a working principle of a phase power device according to an embodiment of the present disclosure. As illustrated in FIG. 2, phase power control components 21 to 24 are disposed on a circulation pipeline 1 clockwise, and pistons of the phase power control components 21 to 24 alternately push and retreat. There are always four states on the whole: at an initial moment, it may be set that the piston of the phase power control component 21 is about to push from top to bottom, the piston of the phase power control component 22 is about to push from middle to top, the piston of the phase power control component 23 is about to push from bottom to top, and the piston of the phase power control component 24 is about to push from middle to bottom. The pistons of the phase power control components 21 to 24 have a same moving speed, so a volume of the fluid in the circulation pipeline 1 remains constant. When ignoring a local pressure fluctuation caused by a piston movement, the closed pipeline has a constant pressure therein, that is, a fluid flow under a high pressure can be realized in the circulation pipeline 1.

It is set that a moving speed of the piston of the phase power control component 21 is $\vec{u}_{1i}$, a moving speed of the piston of the phase power control component 22 is $\vec{u}_{2i}$, a moving speed of the piston of the phase power control component 23 is $\vec{u}_{3i}$, and a moving speed of the piston of the phase power control component 24 is $\vec{u}_{4i}$. It is set that a flow velocity of the fluid in a pipe section a corresponding to the phase power control component 21 is $\vec{U}_{1i}$, a flow velocity of the fluid in a pipe section b corresponding to the phase power control component 22 is $\vec{U}_{2i}$, a flow velocity of the fluid in a pipe section c corresponding to the phase power control component 23 is $\vec{U}_{3i}$, and a flow velocity of the fluid in a pipe section d corresponding to the phase power control component 24 is $\vec{U}_{4i}$, wherein i represents the number of piston movements.

The following relationship exists between the moving speed of the piston of each phase power control component and the flow velocity of the fluid in the pipe section corresponding to the phase power control component:

$\vec{U}_{1i} = \vec{u}_{1i} + \vec{U}_{4i}$ $\vec{U}_{2i} = \vec{u}_{2i} + \vec{U}_{1i}$ $\vec{U}_{3i} = \vec{u}_{3i} + \vec{U}_{2i}$ $\vec{U}_{4i} = \vec{u}_{4i} + \vec{U}_{3i}$ Assuming that an included angle between a direction of the moving speed of the piston of the phase power control component and a direction of the flow velocity of the fluid in the pipe section corresponding to the phase power control component is 45°, the following relationships exist between the moving speeds of the piston of the adjacent phase power control components:

$\vec{u}_{2i} = \vec{u}_{1i} \times [(-1)^1 j]$ $\vec{u}_{3i} = \vec{u}_{2i} \times [(-1)^2 j]$ $\vec{u}_{4i} = \vec{u}_{3i} \times [(-1)^3 j]$ $\vec{u}_{1i} = \vec{u}_{4i} \times [(-1)^4 j]$ where i is the number of piston movements, and j is an imaginary unit vector.

Under the condition that the pistons of the phase power control components move in sequence at a constant speed, the pistons move a certain number of rounds, during which the flow velocities of the fluid in the pipe sections of the circulation pipeline 1 are gradually consistent and remain stable, and accordingly, the frequency and speed of movement of the piston of each phase power control component tend to be constant, so that the fluid in the circulation pipeline 1 is wholly stable.

It is clear that the continuous pushing of the pistons of the phase power control components provides power for the continuous flow of the fluid in the circulation pipeline 1, and the moving speed of the piston determines the flow rate of the fluid.

The fluid in the circulation pipeline 1 is driven by the pistons of the four phase power control components 2 alternately, and gradually reaches a design flow velocity $U_c$ from the static state. An internal friction of the fluid and a resistance generated at a wall surface of the pipeline cause energy loss to the flow. Therefore, to maintain the design flow velocity $U_c$, it is necessary to make an energy supplement.

The energy loss of the internal friction of the fluid is expressed as $h_f$, and a pressure drop caused thereby is expressed as $\Delta p_f$. The energy loss of the resistance generated at the wall surface of the pipeline is expressed as $h'_f$, and a pressure drop caused thereby is expressed as $\Delta p'_f$. A total resistance loss is expressed as $\Sigma h_f$, and a pressure drop caused thereby is expressed as $\Sigma \Delta p$. The following equation can be obtained according to fluid mechanics:

$$\sum h_f = \lambda \frac{(l + \sum l_e)}{d} \frac{U^2}{2} \quad (1)$$

where λ represents a friction factor, d represents an inner diameter of the circulation pipeline 1, l represents a length of the circulation pipeline 1, $l_e$ represents an equivalent length of a pipeline deformation structure of the circulation pipeline 1, and U represents a flow velocity of the fluid.

The pistons of the four phase power control components 2 push the fluid in the piston barrels to push the fluid in the circulation pipeline 1 to flow, that is, the fluid in the piston barrel is the source of energy supplement. It is set that a fluid mass in the piston barrel is Δm, a area of the piston is S and a pushing distance of the piston is L. It is set that an initial velocity of the fluid in the piston barrel is $u_0$, an acceleration of the fluid is a, and action time is t. It is set that the flow velocity of the fluid in the circulation pipeline 1 is U, and a corresponding pressure is P. it is assumed that the piston is powered by an air source with a pressure of $P_{gas}$.

When the phase power device works, the pressure on the piston of the phase power control component 2 is:

$$F = \Delta PS = (P_{gas} - P)S \quad (2)$$

The piston of the phase power control component 2 does work (supplements energy) on the internal fluid as follows:

$$W = FL \quad (3)$$

The force on the piston of the phase power control component 2 is:

$$F = \Delta m a \quad (4)$$

The velocity of the fluid in the piston barrel of the phase power control component 2 is:

$$u = u_0 + at \quad (5)$$

When $U < U_c$, the energy supply is started and the pressure $P_{gas}$ of the air source is regulated so that u is great than U, resulting in the movement of the piston of the phase power control component 2. It is set that $\varepsilon = u - U$ (6).

The $\varepsilon$ is a set value, and when $\varepsilon$ is large, increasing the pressure $P_{gas}$ of the air source increasing the air source pressure will not only increase the moving speed of a single piston, but also increase the frequency f of the piston movement. When the value of $\varepsilon$ decreases gradually until U reaches the design flow velocity $U_c$, the movement frequency f decreases to the lowest and the pressure $P_{gas}$ of the air source is constant.

In this case, the fluid flow in the circulation pipeline 1 is dynamically balanced, and the movements of the pistons of the four phase power control components 2 are stable. The total resistance loss is balanced with the supplementary energy, namely:

$$\Sigma \Delta p = f \Delta P = f(P_{gas} - P) \quad (7)$$

The phase power device according to the embodiment of the present disclosure includes a circulation pipeline and a preset number of phase power control components. The circulation pipeline is configured to provide a channel for fluid circulation. The preset number of phase power control components are disposed on the circulation pipeline and configured to drive the fluid circulation in the circulation pipeline 1, so that the fluid can meet a set flow requirement during the experiment, thus decreasing the use of auxiliary devices, and reducing the experiment costs. The space occupied by the phase power device is reduced due to the use of the circulation pipeline. In addition, the phase power device according to the embodiment of the present disclosure enables a simulated flow rate in laboratories to be equal to that of a field application, eliminating the use of a flow velocity equivalent simulation and thus improving the authenticity of the experiment.

Figure 3:
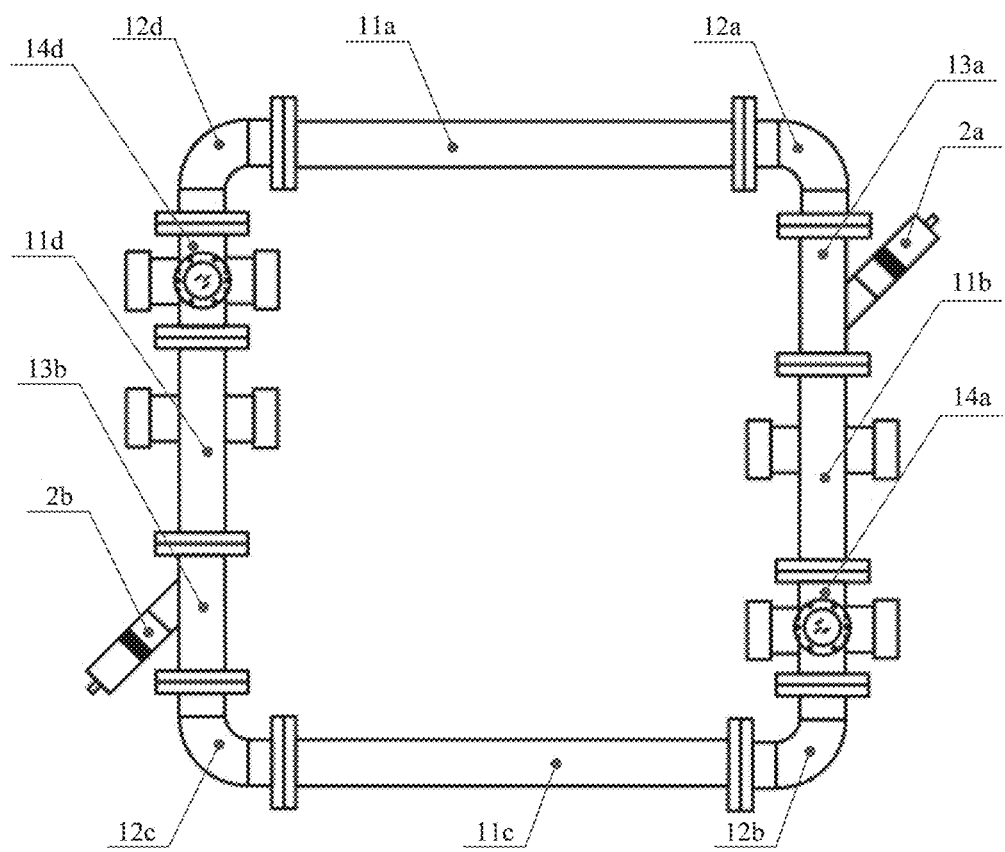
FIG. 3 is a schematic structural diagram of a phase power device according to another embodiment of the present disclosure.

FIG. 3 is a schematic structural diagram of a phase power device according to another embodiment of the present disclosure. As illustrated in FIG. 3, on the basis of the above embodiments, the circulation pipeline 1 further includes four straight pipe sections 11a to 11d, and four elbow pipe sections 12a to 12d, at least one phase power pipe section and at least one observation window pipe section.

The circulation pipeline 1 is composed of the straight pipe sections 11a to 11d, the elbow pipe sections 12a to 12d, the at least one phase power pipe section and the at least one observation window pipe section, which are connected end to end, and the phase power pipe section is provided with the phase power control component. The numbers of the phase power pipe sections and the observation window pipe sections are set according to actual needs, and are not limited in the embodiment of the present disclosure.

For example, as illustrated in FIG. 3, the phase power device includes two phase power pipe sections 13a and 13b, and two observation window pipe sections 14a and 14b. The phase power pipe section 13a is provided with the phase power control component 2a, and the phase power pipe section 13b is provided with the phase power control component 2b. The circulation pipeline 1 is composed of the straight pipe section 11a, the elbow pipe section 12a, the phase power pipe section 13a, the straight pipe section 11b, the observation window pipe section 14a, the elbow pipe section 12b, the straight pipe section 11c, the elbow pipe section 12c, the phase power pipe section 13b, the straight pipe section 11d and the elbow pipe section 12d connected in sequence. The observation window pipe section 14a and the observation window pipe section 14b may be provided with glass observation windows for observing and recording the fluid in the circulation pipeline during the experiment, and the observation window pipe section may also be provided with operation window for mounting a flowmeter configured to measure the flow velocity of the fluid in the circulation pipeline 1.

Figure 4:
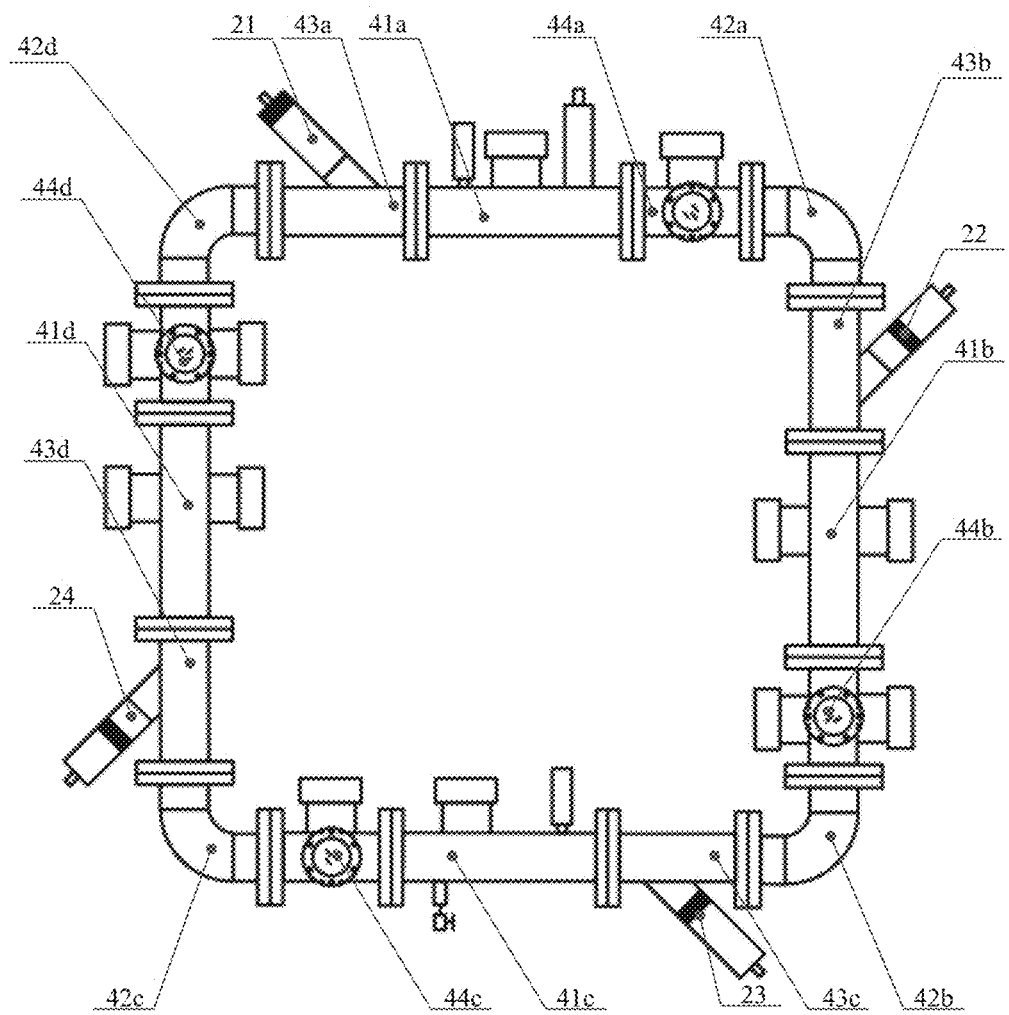
FIG. 4 is a schematic structural diagram of a phase power device according to still another embodiment of the present disclosure.

FIG. 4 is a schematic structural diagram of a phase power device according to another embodiment of the present disclosure. As illustrated in FIG. 4, on the basis of the above embodiments, the phase power device further includes four observation window pipe sections 44a to 44d, and four phase power pipe sections 43a to 44d.

Each of the phase power pipe sections is provided with one of the phase power control components. For example, the phase power pipe section 43a is provided with the phase power control component 21, the phase power pipe section 43a is provided with the phase power control component 22, the phase power pipe section 43c is provided with the phase power control component 23, and the phase power pipe section 43d is provided with the phase power control component 24. The four straight pipe sections, the four observation window pipe sections, the four elbow pipe sections and the four phase power pipe sections are classified into four groups of pipes, and each group of pipes includes one of the straight pipe sections, one of the observation window pipe sections, one of the elbow pipe sections and one of the phase power pipe sections. For example, the phase power pipe section 43a, the straight pipe section 41a, the observation window pipe section 44a and the elbow pipe section 42a form a group of pipes; the phase power pipe section 43b, the straight pipe section 41b, the observation window pipe section 44b and the elbow pipe section 42b form a group of pipes; the phase power pipe section 43c, the straight pipe section 41c, the observation window pipe section 44c and the elbow pipe section 42c form a group of pipes, and the phase power pipe section 43d, the straight pipe section 41d, the observation window pipe section 44d and the elbow pipe section 42d form a group of pipes. The phase power pipe section, the straight pipe section, the observation window pipe section and the elbow pipe section in each group of pipes are connected in sequence, and the groups of pipes are connected end to end. For example, the phase power pipe section 43a, the straight pipe section 41a, the observation window pipe section 44a and the elbow pipe section 42a are connected in sequence; the phase power pipe section 43b, the straight pipe section 41b, the observation window pipe section 44b and the elbow pipe section 42b are connected in sequence; the phase power pipe section 43c, the straight pipe section 41c, the observation window pipe section 44c and the elbow pipe section 42c are connected in sequence; the phase power pipe section 43d, the straight pipe section 41d, the observation window pipe section 44d and the elbow pipe section 42d are connected in sequence; the elbow pipe section 42a is connected to the phase power pipe section 43b, the elbow pipe section 42b is connected to the phase power pipe section 43c, the elbow pipe section 42c is connected to the phase power pipe section 43d, and the elbow pipe section 42d is connected to the phase power pipe section 43a. The phase power control components 21 to 24 may be uniformly disposed along the circulation pipeline 1.

In the phase power device according to the embodiment of the present disclosure, the circulation pipeline is constructed in multiple sections, for the convenience of the combination of the circulation pipeline.

As illustrated in FIG. 4, further on the basis of the above embodiments, two ends of each of the straight pipe sections are provided with flanges, two ends of each of the observation window pipe sections are provided with flanges, two ends of each of the elbow pipe sections are provided with flanges, and two ends of each of the phase power pipe sections are provided with flanges. The straight pipe sections, the elbow pipe sections, the phase power pipe sections and the observation window pipe sections are connected through the flanges to form the circulation pipeline. An O-ring clamping groove may be disposed in the flange, and an O-ring may be mounted in the O-ring clamping groove for sealing.

For example, the phase power pipe section 43a, the straight pipe section 41a, the observation window pipe section 44a and the elbow pipe section 42a are connected in sequence by flanges; the phase power pipe section 43b, the straight pipe section 41b, the observation window pipe section 44b and the elbow pipe section 42b are connected in sequence by flanges; the phase power pipe section 43c, the straight pipe section 41c, the observation window pipe section 44c and the elbow pipe section 42c are connected in sequence by flanges; the phase power pipe section 43d, the straight pipe section 41d, the observation window pipe section 44d and the elbow pipe section 42d are connected in sequence by flanges; the elbow pipe section 42a and the phase power pipe section 43b are connected by flanges, the elbow pipe section 42b and the phase power pipe section 43c are connected by flanges, the elbow pipe section 42c and the phase power pipe section 43d are connected by flanges, and the elbow pipe section 42d and the phase power pipe section 43a are connected by flanges.

In the phase power device according to the embodiment of the present disclosure, the pipe sections of the circulation pipeline are connected by flanges, for the convenience of the assembly of the circulation pipeline.

Further on the basis of the above embodiments, the straight pipe section is provided with a fluid injection interface, a pressure sensor interface, an operation window and a safety valve. The fluid injection interface is configured to connected a fluid pump, which can inject fluid into the circulation pipeline 1 through the fluid injection interface. The pressure sensor interface is configured to connect a pressure sensor. The operation window may be a structure composed of a flange and a straight pipe, for the convenience of the operation after the circulation pipeline 1 is connected. The safety valve is configured for pressure relief. The specific positions of the fluid injection interface, the pressure sensor interface, the operation window and the safety valve on the straight pipe section are set according to actual needs, and are not limited in the embodiment of the present disclosure.

Further on the basis of the above embodiments, the observation window pipe section is provided with one glass observation window, or two symmetrical glass observation windows, configured to observe and research the flow situation of the fluid in the circulation pipeline 1.

Further on the basis of the above embodiments, the preset number of phase power control components 2 are uniformly disposed along the circulation pipeline 1, for the convenience of controlling the moving speed of the piston of the phase power control component 2 and maintaining the stability of the fluid flowing in each section of the circulation pipeline.

Figure 5:
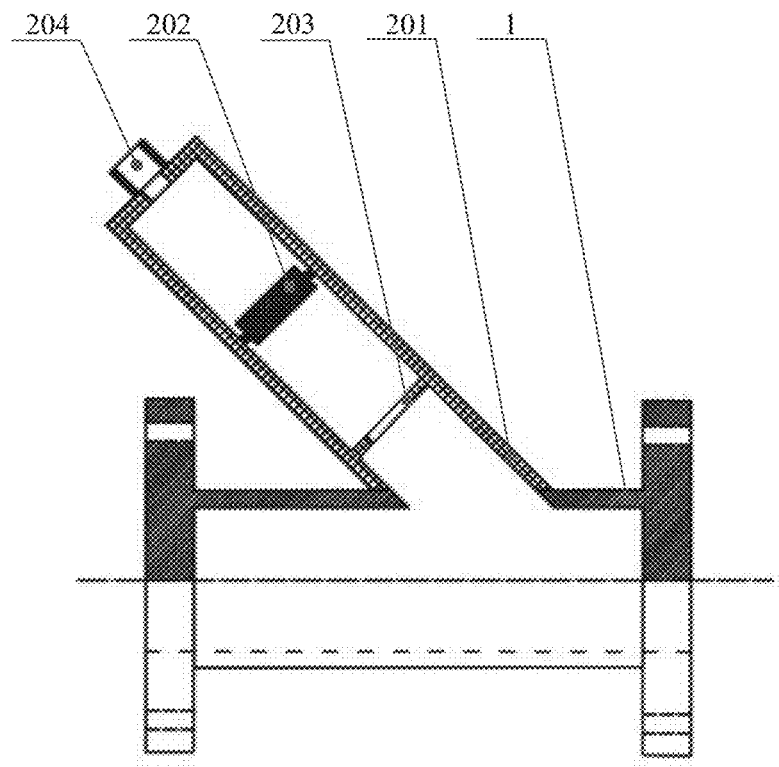
FIG. 5 is a schematic structural diagram of a phase power control component of a phase power device according to an embodiment of the present disclosure.

FIG. 5 is a schematic structural diagram of a phase power control component of a phase power device according to an embodiment of the present disclosure. As illustrated in FIG. 5, on the basis of the above embodiments, the phase power control component 2 further includes a piston barrel 201, a piston 202, a retaining ring 203 and a joint 204.

The piston 202 is disposed in the piston barrel 201 and movable along the piston barrel 201. The joint 204 is disposed at a tail of the piston barrel 201. The retaining ring 203 is fixed on an inner wall of the piston barrel 201 to limit a movement of the piston 201 towards the circulation pipeline 1, and the retaining ring 203 may be a circular ring structure. A front end of the piston barrel 201 is disposed on the circulation pipeline 1, and the piston barrel 201 is communicated with the circulation pipeline 1. The piston barrel 201 may be welded on the circulation pipeline 1, and an included angle between the piston barrel 201 and the circulation pipeline 1 may be 30°, 45°, 60°, and the like, which may be set according to actual needs, and is not limited in the embodiments of the present disclosure.

Figure 6:
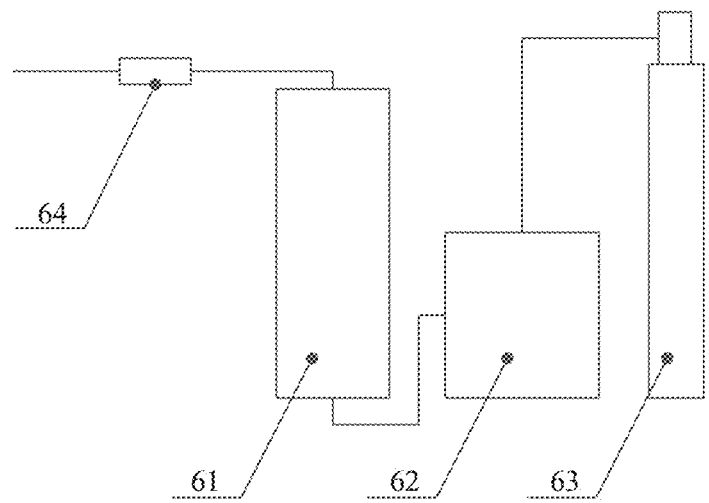
FIG. 6 is a schematic structural diagram of a gas tank joint control device according to an embodiment of the present disclosure.

The joint 204 may be connected to an external pipeline which may be connected to a gas tank joint control device. FIG. 6 is a schematic structural diagram of a gas tank joint control device according to an embodiment of the present disclosure. As illustrated in FIG. 6, the gas tank joint control device according to the embodiment of the present disclosure includes a high-pressure gas tank 61, a gas booster pump 62, a gas cylinder 63, and a pneumatic valve 64. The gas cylinder 63 is connected to the gas booster pump 62, the gas booster pump 62 is connected to the high-pressure gas tank 61, the high-pressure gas tank 61 is connected to the pneumatic valve 64, and the pneumatic valve 64 is connected to the joint 204 through a gas pipe. The gas in the gas cylinder 63 is pressurized by the gas booster pump 62, so that the gas in the high-pressure gas tank reach a set pressure. When the pneumatic valve 64 is opened, the gas can quickly flow out and flow into the piston barrel 201 to push the piston 202 to move towards the circulation pipeline 1. When the piston 202 moves towards the joint 204, the pneumatic valve 64 is closed and the joint 204 vents the gas. The joint 204 may be connected to the pneumatic valve 64 through a three-way solenoid valve.

Figure 7:
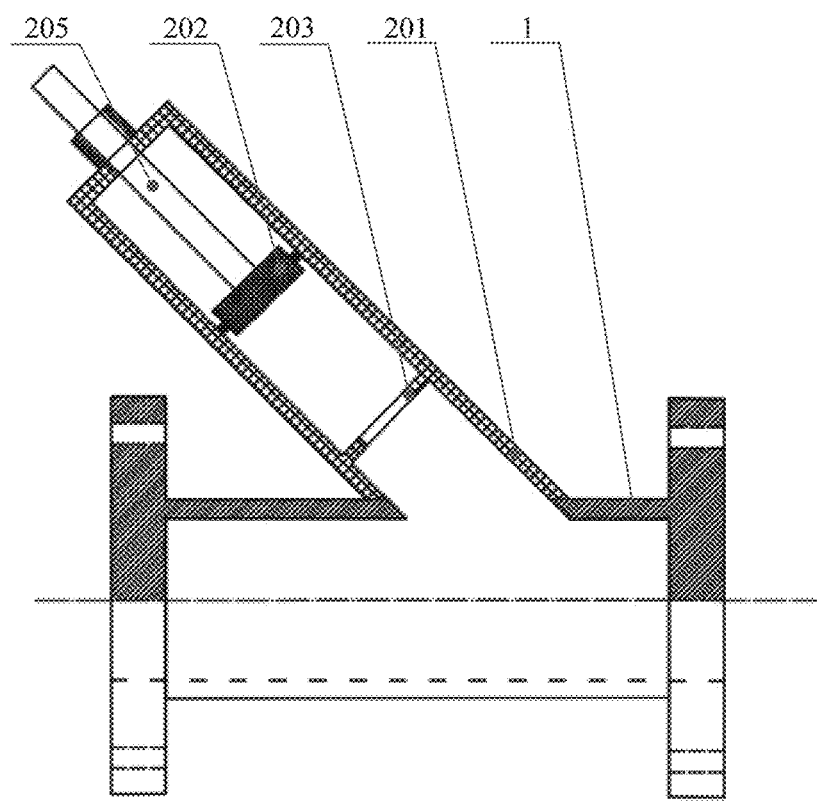
FIG. 7 is a schematic structural diagram of a phase power control component of a phase power device according to another embodiment of the present disclosure.

FIG. 7 is a schematic structural diagram of a phase power control component of a phase power device according to another embodiment of the present disclosure. As illustrated in FIG. 7, on the basis of the above embodiments, the phase power control component 2 further includes a piston barrel 201, a piston 202 and a retaining ring 203.

The piston 201 is disposed in the piston barrel 202 and movable along the piston barrel 201. The piston 202 includes a piston rod 205, which is extended out of a rear end of the piston barrel 201 and connectable to a motor to drive the piston 202 to move by the motor. The retaining ring 203 is fixed on an inner wall of the piston barrel 201 to limit a movement of the piston 202 towards the circulation pipeline 1, and the retaining ring 203 may be a circular ring structure. A front end of the piston barrel 201 is disposed on the circulation pipeline 1, and the piston barrel 201 is communicated with the circulation pipeline 1. The piston barrel 201 may be welded on the circulation pipeline 1, and an included angle between the piston barrel 201 and the circulation pipeline 1 may be 30°, 45°, 60°, and the like, which may be set according to actual needs, and is not limited in the embodiments of the present disclosure.

Further on the basis of the above embodiments, the preset number is 4 or 8, that is, four or eight phase power control components 2 may be disposed on the circulation pipeline 1. The phase power control components 2 may be uniformly disposed on the circulation pipeline 1.

Figure 8:
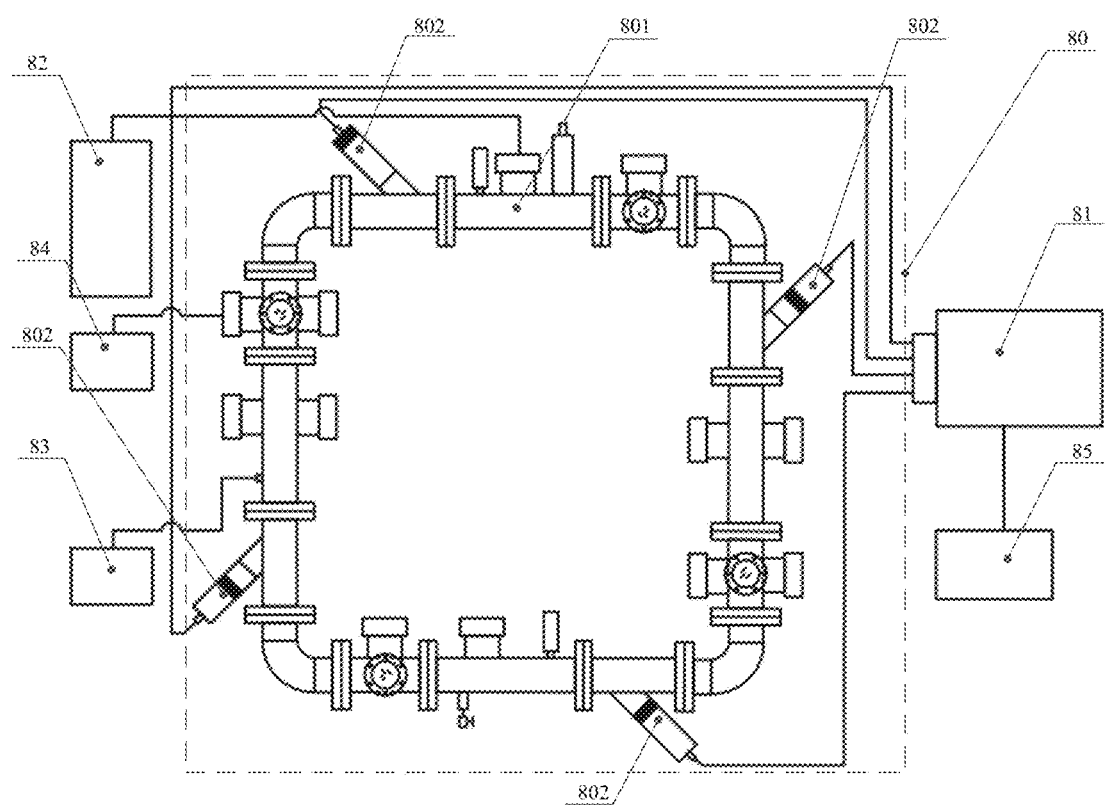
FIG. 8 is a schematic structural diagram of a fluid experiment system according to an embodiment of the present disclosure.

FIG. 8 is a schematic structural diagram of a fluid experiment system according to an embodiment of the present disclosure. As illustrated in FIG. 8, further on the basis of the above embodiments, the fluid experiment system according to an embodiment of the present disclosure includes a phase power device 80 according to any one of the above embodiments, a power joint control module 81, a fluid injection module 82, a pressure detection module 83, a flow velocity detection module 84, and an integrated control module 85.

The power joint control module 81 is coupled to a preset number of phase power control components 802, respectively, and configured to supply power thereto. The fluid injection module 82 is configured to inject fluid into the circulation pipeline 801. The pressure detection module 83 is configured to detect a pressure in the circulation pipeline 801. The flow velocity detection module 84 is configured to detect a flow velocity of the fluid in the circulation pipeline 801. The integrated control module 85 is coupled to the pressure detection module 83, the flow velocity detection module 84 and the power joint control module 81, respectively, and configured to control actions of the preset number of phase power control components 802 through the power joint control module 81.

Specifically, the power joint control module 81 supplies power to the phase power control components 802 by means of a hydraulic joint control, a motor joint control or a gas high-pressure tank joint control. The applicable conditions of the above three powering modes are detailed in Table 1. The powering mode of the power joint control module 81 is selected according to actual needs, and is not limited in the embodiments of the present disclosure.

disposed on the circulation pipeline 801. The fluid injection module 82 may be a plunger pump. The preset pressure is set according to actual needs, and is not limited in the embodiment of the present disclosure.

The pressure detection module 83 may be disposed on the circulation pipeline 801, and configured to detect the pressure of the fluid in the circulation pipeline 801, and transmit the detected pressure of the fluid to the integrated control module 85. The pressure detection module 83 may be a pressure sensor.

The flow velocity detection module 84 is configured to detect a flow velocity of the fluid in the circulation pipeline 801, and transmit the detected flow velocity to the integrated control module 85. The flow velocity detection module 84 may detect the flow velocity of the fluid by observing the movement of an object in the observation window of the circulation pipeline 801, for example, adopting a velocity measurement mode that tracks fluorescent particles by laser light, which is particularly suitable for laboratories. Alternatively, a Venturi tube may be adopted to measure the flow velocity of the fluid, but the Venturi tube needs to be mounted on a parallel bypass, and this velocity measurement mode is suitable for industrial applications.

The integrated control module 85 may be an industrial computer, and is configured to control actions of the preset number of phase power control components 802 through the power joint control module 81, including controlling the moving speed of the piston of the phase power control components 802. The integrated control module 85 receives a pressure P of the fluid transmitted by the pressure detection module 83 and a flow velocity U of the fluid transmitted by the flow velocity detection module 84. At the initial moment, $U<U_c$, and for a set $\varepsilon$, the integrated control module 85 may calculate $P_{gas}$ according to the formulas (2), (4), (5) and (6). The integrated control module 85 sets a working pressure of the power joint control module 81 to be $P_{gas}$, and the preset number of phase power control components 802 drive the

TABLE 1

Comparison of Three Powering Modes

| Mode | Advantage | Comparison under the same condition @ an ambient pressure of 20 MPa, and a piston with an outer diameter of 5 cm | Applicable condition |
| --- | --- | --- | --- |
| Hydraulic joint control | High pressurization speed | The speed of the piston can reach 5 cm/s, i.e., 10 m³/d. The volume of the device is about 1 m × 1 m × 1 m, which is noisy and requires high power, and it is necessary to configure a liquid tank. | The flow rate is within 4 to 10 m³/d. |
| Motor joint control | Uniform pressurization process, hard connection with high reaction speed. | The maximum speed of the piston is 2 cm/s, i.e., 4 m³/d. | The flow rate is below 4 m³/d |
| Gas tank joint control | High pressurization speed and fast pressure relief. | The speed of the piston can reach 30 cm/s, i.e., 60 m³/d; a gas tank is required; and the volume is small. | The flow rate is below 60 m³/d |

The fluid injection module 82 injects fluid into the circulation pipeline 801, so that the fluid in the circulation pipeline 801 reaches a preset pressure. Moreover, during the acceleration of the fluid to a stable speed, a pressure fluctuation will occur. According to the pressure detected by the pressure detection module 83, the pressure of the fluid in the circulation pipeline 801 may be regulated by replenishing fluid to the circulation pipeline 801 or sucking out fluid from the circulation pipeline 801 by the fluid injection module 82. The fluid injection module 82 may be connected to the circulation pipeline 801 through a fluid injection interface fluid in the circulation pipeline 1 to flow. When the integrated control module 85 judges that U reaches a design flow velocity $U_c$, $P_{gas}$ is calculated according to formulas (1) and (7) and kept constant.

The fluid experiment system according to the embodiment of the present disclosure may further include an observation module, which may include an industrial camera, a video camera, an adjustment bracket, an image collection card and a storage computer. The observation module is configured to record an experiment process, and a lens of the industrial camera or the video camera may be enabled to aim at the observation window disposed on the circulation pipeline 801, so as to photograph the fluid flowing through the observation window in the circulation pipeline 801 during the experiment.

The fluid experiment system according to the embodiment of the present disclosure includes a phase power device, a power joint control module, a fluid injection module, a pressure detection module, a flow velocity detection module and an integrated control module. The power joint control module is coupled to the preset number of phase power control components respectively and configured to supply power thereto. The fluid injection module is configured to inject fluid into the circulation pipeline. The pressure detection module is configured to detect a pressure in the circulation pipeline. The flow velocity detection module is configured to detect a flow velocity of the fluid in the circulation pipeline. The integrated control module is coupled to the pressure detection module, the flow velocity detection module and the power joint control module respectively, and configured to control actions of the preset number of phase power control components through the power joint control module. Because the phase power device is adopted for experiments, the use of auxiliary devices can be decreased, and the experimental costs can be reduced. In addition, the simulated flow rate in laboratories is equal to that of a field application, and a flow velocity equivalent simulation is no longer adopted, which improves the authenticity of the experiment.

The working process of the fluid experiment system according to the embodiment of the present disclosure is described as follows, by simulating the actual injection situation of a water-gas dispersion system using the fluid experiment system according to the embodiment of the present disclosure. Bubbles are generated under the conditions of high pressure and large flow rate, and flow with the fluid. Whether the bubbles float up and merge, and the degree of action are recorded. Experimental conditions: the phase power device 80 is placed vertically, the flow rate of the fluid is 15 m³/d, the flow direction is clockwise, the pressure of the fluid is 20 MPa, and the temperature is the room temperature; the bubbles are generated at the bottom of the circulation pipeline, and the movement of the bubbles in the circulation pipeline is observed.

(1) Process Preparation and Device Mounting

The phase power device illustrated in FIG. 4 is adopted and placed vertically, in which the four phase power control components 802 have the same shape and size. As the flow rate of the fluid is 15 m³/d, it can be seen from Table 1 that the power joint control module 81 should adopt the gas tank joint control mode. The gas tank joint control device illustrated in FIG. 6 may be connected to the four phase power control components 802 to supply power thereto.

In order to generate the bubbles, a bubble generation device may be mounted at the bottom of the right-handed straight pipe section of the circulation pipeline 801. After an operation window opposite to the straight pipe section is disassembled, the bubble generation device may be mounted into the straight pipe section, and the gas injection pipeline may be connected to the outside through a special sealing channel of the operation window on one side to connect the gas device.

(2) Fully Filling the Pipeline with Fluid (Water) and Pressurizing the Same

The circulation pipeline 801 is fully filled with water by the fluid injection module 82.

Under the normal pressure, the initial positions of the pistons in the four phase power control components 802 are adjusted so that the piston of the phase power control component 21 is about to push from top to bottom, the piston of the phase power control component 22 is about to push from middle to top, the piston of the phase power control component 23 is about to push from bottom to top, and the piston of the phase power control component 24 is about to push from middle to bottom. Gas and/or water is injected into both sides of the pistons, so that the four pistons reach the initial positions.

Next, water is injected into the circulation pipeline 801 by the fluid injection module 82, the initial position of each piston is maintained, and the pressure in the circulation pipeline 801 is increased until the pressure of the fluid in the circulation pipeline 801 reaches 20 MPa.

(3) Realizing a Stable Flow with a Large Flow Rate

The design flow velocity $U_c$ may be obtained according to a target flow rate 15 m³/d.

At the initial moment, the integrated control module 85 calculates the gas supply pressure $P_{gas}$ of the gas tank joint control device according to the set ε, and the pistons of the four phase power control components move at the same speed, wherein, gas enters the phase power control component 21 and the phase power control component 24, pushing their pistons to move to the bottom; the pistons of the phase power control component 22 and the phase power control component 23 move to the rear to discharge the gas; then the piston of the phase power control component 21 advances to the middle, the piston of the phase power control component 22 retreats to the top, the piston of the phase power control component 23 retreats to the middle, and the piston of the phase power control component 24 advances to the bottom. In this case, the fluid in the circulation pipe 801 has a rate $U_1$. The integrated control module 85 continues to control the gas tank joint control device to drive the pistons of the four phase power control components 802 to move until the flow velocity U of the fluid reaches the design flow velocity $U_c$, that is, a stable closed continuous flow with a flow rate of 15 m³/d is formed clockwise in the circulation pipeline illustrated in FIG. 4.

(4) Target Observation Experiment

Under the condition that the fluid in the circulation pipeline flows stably and continuously, a target observation experiment is carried out, i.e., injecting high-pressure gas into the bubble generation device, controlling a difference between the gas pressure and the internal fluid pressure, and controlling the bubbles to be ejected at a certain speed, so that the ejected bubbles will be influenced by the fluid flow. The form of the bubble is recorded by an industrial camera disposed outside the glass observation window of the observation window pipe section. In the other three glass observation windows, it is possible to observe the migration state of the horizontal section, the acceleration carrying effect of the left-handed straight pipe section, and the horizontal migration state of the straight pipe section at the top.

During the operation of the phase power device, in order to prevent the situations such as the pressure is out of control, a safety valve is mounted to ensure the safety of the experiment.

In the present disclosure, the descriptions of reference terms 'one embodiment', 'one specific embodiment', 'some embodiments', 'for example', 'an example', 'a specific example' or 'some examples' and the like mean that the specific features, structures, materials, or characteristics described in conjunction with the embodiment(s) or example(s) are included in at least one embodiment or example of the present disclosure. In the present disclosure, the schematic expressions of the above terms do not necessarily aim at the same embodiment or example. Moreover, the described specific features, structures, materials, or characteristics may be appropriately combined in any one or more embodiments or examples.

The above specific embodiments make further detailed explanations to the objectives, technical solutions and advantageous effects of the present disclosure. It should be appreciated that those described above are only specific embodiments of the present disclosure and are not intended to limit the protection scope of the present disclosure. Any modification, equivalent substitution or improvement made within the spirit and principle of the present disclosure should fall within the protection scope of the present disclosure.

The invention claimed is:

1. A phase power device, comprising a circulation pipeline and a preset number of phase power control components, wherein the circulation pipeline is configured to provide a channel for fluid circulation, and the preset number of phase power control components are disposed on the circulation pipeline to drive the fluid circulation in the circulation pipeline;
the circulation pipeline comprises four straight pipe sections, four elbow pipe sections, at least one phase power pipe section, and at least one observation window pipe section;
the four straight pipe sections, the four elbow pipe sections, the at least one phase power pipe section and the at least one observation window pipe section are connected end to end to form the circulation pipeline, and the phase power pipe section is provided with the phase power control component;
the number of the observation window pipe sections is four, and the number of the phase power pipe sections is four; and
each of the phase power pipe sections is provided with one of the phase power control components; the four straight pipe sections, the four observation window pipe sections, the four elbow pipe sections and the four phase power pipe sections are classified into four groups of pipes, and each group of pipes comprises one of the straight pipe sections, one of the observation window pipe sections, one of the elbow pipe sections and one of the phase power pipe sections; the phase power pipe section, the straight pipe section, the observation window pipe section and the elbow pipe section in each group of pipes are connected in sequence, and the groups of pipes are connected end to end.

2. The phase power device according to claim 1, wherein two ends of each of the straight pipe sections are provided with flanges, two ends of each of the observation window pipe sections are provided with flanges, two ends of each of the elbow pipe sections are provided with flanges, and two ends of each of the phase power pipe sections are provided with flanges;
the straight pipe sections, the elbow pipe sections, the phase power pipe sections and the observation window pipe sections are connected through the flanges to form the circulation pipeline.

3. The phase power device according to claim 1, wherein the straight pipe section is provided with a fluid injection interface, a pressure sensor interface, an operation window and a safety valve.

4. The phase power device according to claim 1, wherein the preset number of phase power control components are uniformly disposed along the circulation pipeline.

5. The phase power device according to claim 1, wherein the phase power control component comprises a piston barrel, a piston, a retaining ring, and a joint;
wherein the piston is disposed in the piston barrel and movable along the piston barrel, the joint is disposed at a tail of the piston barrel, the retaining ring is fixed on an inner wall of the piston barrel to limit a movement of the piston towards the circulation pipeline, a front end of the piston barrel is disposed on the circulation pipeline, and the piston barrel is communicated with the circulation pipeline.

6. The phase power device according to claim 1, wherein the phase power control component comprises a piston barrel, a piston, and a retaining ring;
wherein the piston is disposed in the piston barrel and movable along the piston barrel; the piston comprises a piston rod, which is extended out of a rear end of the piston barrel; the retaining ring is fixed on an inner wall of the piston barrel to limit a movement of the piston towards the circulation pipeline; a front end of the piston barrel is disposed on the circulation pipeline, and the piston barrel is communicated with the circulation pipeline.

7. The phase power device according to claims 1, wherein the preset number is 4 or 8.

8. A fluid experiment system, comprising a phase power device a power joint control module, a fluid injection module, a pressure detection module, a flow velocity detection module and an integrated control module;
wherein the phase power device comprises a circulation pipeline and a preset number of phase power control components, wherein the circulation pipeline is configured to provide a channel for fluid circulation, and the preset number of phase power control components are disposed on the circulation pipeline to drive the fluid circulation in the circulation pipeline;
the circulation pipeline comprises four straight pipe sections, four elbow pipe sections, at least one phase power pipe section, and at least one observation window pipe section;
the four straight pipe sections, the four elbow pipe sections, the at least one phase power pipe section and the at least one observation window pipe section are connected end to end to form the circulation pipeline, and the phase power pipe section is provided with the phase power control component;
the number of the observation window pipe sections is four, and the number of the phase power pipe sections is four; and
each of the phase power pipe sections is provided with one of the phase power control components; the four straight pipe sections, the four observation window pipe sections, the four elbow pipe sections and the four phase power pipe sections are classified into four groups of pipes, and each group of pipes comprises one of the straight pipe sections, one of the observation window pipe sections, one of the elbow pipe sections and one of the phase power pipe sections;
the phase power pipe section, the straight pipe section, the observation window pipe section and the elbow pipe section in each group of pipes are connected in sequence, and the groups of pipes are connected end to end;
wherein the power joint control module is coupled to the preset number of phase power control components respectively and configured to supply power thereto; the fluid injection module is configured to inject fluid into the circulation pipeline; the pressure detection module is configured to detect a pressure in the circulation pipeline; the flow velocity detection module is configured to detect a flow velocity of the fluid in the circulation pipeline; and the integrated control module is coupled to the pressure detection module, the flow velocity detection module and the power joint control module respectively, and configured to control actions of the preset number of phase power control components through the power joint control module.

9. The phase power device according to claim 8, wherein two ends of each of the straight pipe sections are provided with flanges, two ends of each of the observation window pipe sections are provided with flanges, two ends of each of the elbow pipe sections are provided with flanges, and two ends of each of the phase power pipe sections are provided with flanges; the straight pipe sections, the elbow pipe sections, the phase power pipe sections and the observation window pipe sections are connected through the flanges to form the circulation pipeline.

10. The phase power device according to claim 8, wherein the straight pipe section is provided with a fluid injection interface, a pressure sensor interface, an operation window and a safety valve.

11. The phase power device according to claim 8, wherein the preset number of phase power control components are uniformly disposed along the circulation pipeline.

12. The phase power device according to claim 8, wherein the phase power control component comprises a piston barrel, a piston, a retaining ring, and a joint;
wherein the piston is disposed in the piston barrel and movable along the piston barrel, the joint is disposed at a tail of the piston barrel, the retaining ring is fixed on an inner wall of the piston barrel to limit a movement of the piston towards the circulation pipeline, a front end of the piston barrel is disposed on the circulation pipeline, and the piston barrel is communicated with the circulation pipeline.

13. The phase power device according to claim 8, wherein the phase power control component comprises a piston barrel, a piston, and a retaining ring;
wherein the piston is disposed in the piston barrel and movable along the piston barrel; the piston comprises a piston rod, which is extended out of a rear end of the piston barrel; the retaining ring is fixed on an inner wall of the piston barrel to limit a movement of the piston towards the circulation pipeline; a front end of the piston barrel is disposed on the circulation pipeline, and the piston barrel is communicated with the circulation pipeline.

14. The phase power device according to claims 8, wherein the preset number is 4 or 8.

* * * * *